United States Patent

[11] 3,549,174

| [72] | Inventors | Ray P. Miles<br>8575 West Melody Lane, Macedonia, 44056;<br>Andrew E. Szucs, 4479 West 226th St., Fairview Park, Ohio 43736 |
|---|---|---|
| [21] | Appl. No. | 763,117 |
| [22] | Filed | Sept. 27, 1968 |
| [45] | Patented | Dec. 22, 1970 |

[54] TOW BAR ASSEMBLY
3 Claims, 2 Drawing Figs.

[52] U.S. Cl. .................................................. 280/491, 280/495, 280/502
[51] Int. Cl. .................................................. B60d 1/04
[50] Field of Search ............................................. 280/491, 493, 495, 502

[56] References Cited
UNITED STATES PATENTS

| 1,535,397 | 4/1925 | Buffington .................... | 280/493 |
| 1,537,249 | 5/1925 | Manley ........................ | 280/503X |

FOREIGN PATENTS

| 558,238 | 12/1943 | Great Britain ............... | 280/503 |

Primary Examiner—Leo Friaglia
Attorney—M. Ted. Raptes

ABSTRACT: The invention relates to a novel simplified tow bar assembly adapted to be used for towing larger vehicles requiring a larger degree of stability while being towed. The assembly provides an adjustable hitching member adapted to firmly engage a flat elongated portion of the rear of the vehicle being towed.

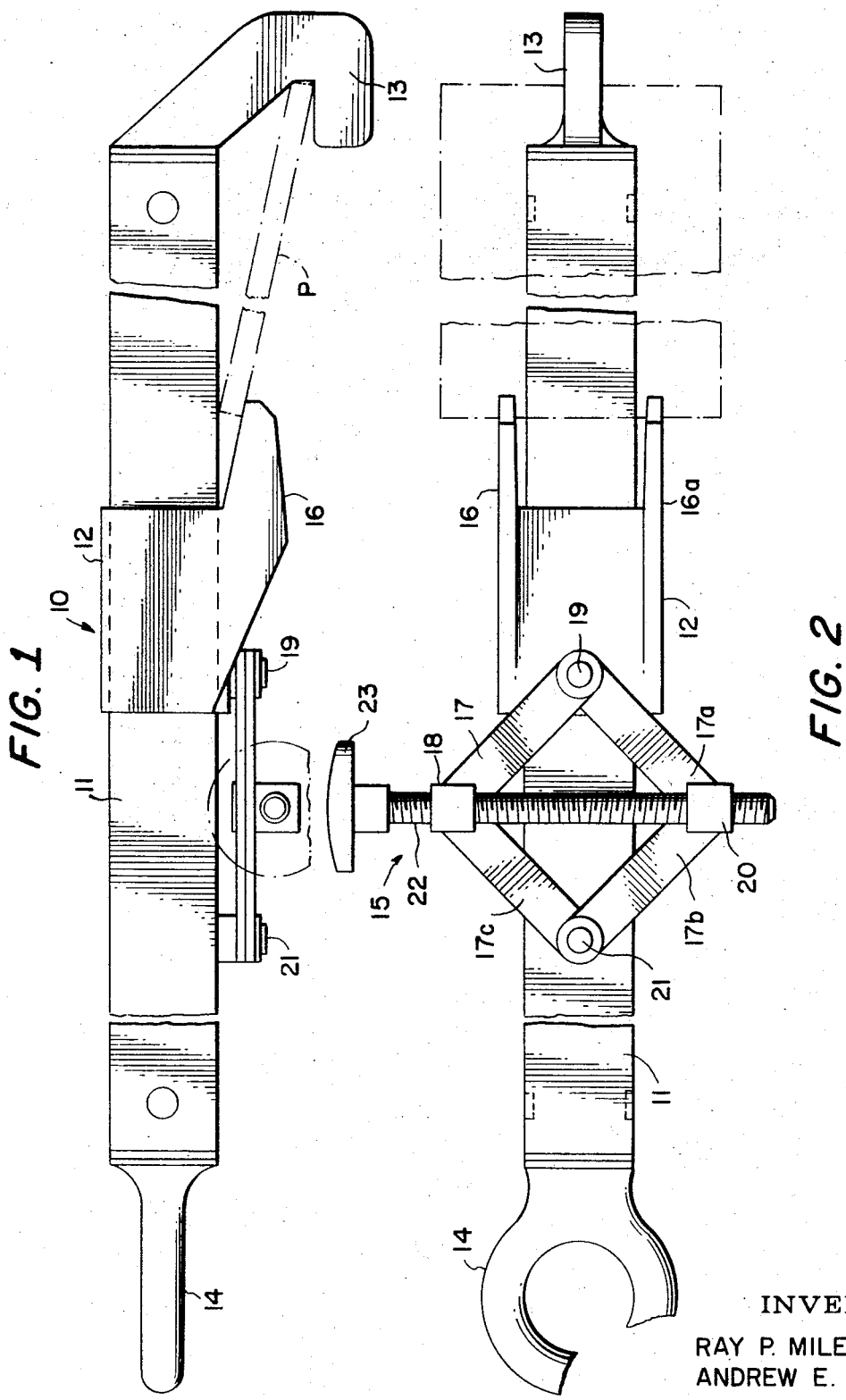

TOW BAR ASSEMBLY

This invention relates to a tow bar assembly. More particularly the invention relates to a tow bar having an adjustable hitching device adapted to firmly engage a larger type vehicle to be towed.

The tow bar assembly of this invention possesses a number of advantages. Its construction is relatively uncomplicated as compared with many of the prior devices known Its operation is simple and can be easily attached to the vehicle to be towed. It is safer and has more positive holding power than devices heretofore known. A particular advantage is its ability to adjust to any width to engage a flat portion of the rear of the vehicle being towed.

An object of this invention is to provide a tow bar assembly which comprises a horizontal member containing a hook member and a sliding lock member adjustable by means of a rotating screw device. The hook member and sliding lock member are adapted to engage a flat section of the vehicle to be towed.

Other objects will be apparent after referring to the following specification and attached drawing in which:

FIG. 1 is a side elevational view of an embodiment of the tow bar assembly showing it in position engaging a plate P, in phantom, which forms a part of a vehicle (not shown) being towed;

FIG. 2 is a bottom view of the tow bar assembly shown in FIG. 1.

Referring to the drawings, the embodiment shown of the two bar assembly 10 comprises a horizontal draw bar 11, a sliding lock 12, a tow bar hook 13, a tow bar eye hook 14, and a rotating screw and linkage device 15 for adjusting the sliding lock 12.

The draw bar 11 may be round or polygonal in cross section and has a tow bar hook 13 secured at one end thereof by suitable means. The hook 13 is designed and adapted to engage and hook one end of a plate or section P at the rear of the vehicle being towed. The sliding lock 12 surrounds the bar 11 and is movably adjustable by means of the rotating screw device 15 to engage the opposite end of plate P by means of jaws 16 and 16a. Accordingly the plate P is firmly head in position between the jaw 16 and the hook 13.

The rotating screw and linkage assembly 15 comprises four connecting links 17, 17a, 17b, and 17c arranged in the form of a parallelogram. Link 17 is pivotally attached to a pivot pin (not shown) on nut 18 and pivot pin 19 secured to sliding lock 12. Link 17a is pivotally attached to a pivot pin (not shown) on nut 20 and pivot pin 19. Link 17b is pivotally attached to a pivot pin on nut 20 and to pivot pin 21. Pivot pin 21 is secured to the bar 11. Link 17c is pivotally attached to pivot pin 21 and to a pivot pin on nut 18.

A screw 22 engages the nuts 18 and 20. Nut 18 has right-hand threads and nut 20 has left-hand threads. Screw 22 is turned by means of hand knob 23. Turning of the screw causes the nuts 18 and 20 to move towards or away from each other thereby adjusting the sliding lock by movement of pivot pin 19. Accordingly, when it is desired to engage or disengage the jaws 16 and 16a to or from plate P, one merely turns the screw 22 in the appropriate direction.

The eye hook 14 is secured to the opposite end of the bar 11 by suitable means and engages the towing vehicle by means of a vertical bar, clamp, etc.

A particular advantage of the novel tow bar assembly is the ease with which it may be secured to a towing vehicle and the vehicle to be towed. Thus, it is only necessary to hook the tow bar hook over the plate P on the vehicle to be towed, adjust the sliding lock 15 until the jaws 16 and 16a firmly engage the other end of the plate, and then to secure the eye hook 14 to the towing vehicle. Similarly, the towed vehicle may be easily disengaged. It is manifest that the towed vehicle is rigidly and safely secured by the tow bar assembly. The attachment to the towing vehicle by means of the eye hook provides for the necessary movements between the two vehicles during the towing operation.

Although one complete embodiment of the invention has been shown and described, it will be apparent to those skilled in the art that other adaptations and modifications may be made without departing from the spirit and scope of the invention.

We claim:

1. A tow bar assembly adapted to engage a rear flat portion of a vehicle to be towed comprising horizontal bar means having eye hook means at one end and second hook means at the opposite end, sliding lock means adapted to travel along said bar means and provided with jaw means, and rotating screw means for adjusting said sliding lock means along said bar means comprising four linkages pivotally connected together, two of which are pivotally connected to said bar and two of which are pivotally connected to said lock, a left hand threaded nut and a right-hand threaded nut each pivotally connected to said linkages, and a screw which engages both of said nuts, whereby said lock means can be adjusted along said bar means by rotation of said screw.

2. The tow bar assembly of claim 1 wherein said second hook means is vertically disposed and adapted to engage the end of a flat member on a vehicle to be towed.

3. A tow bar assembly adapted to engage a rear flat portion of a vehicle to be towed comprising:
   horizontal bar means having eye hook means at one end and second hook means at the opposite end;
   sliding lock means adapted to travel along said bar means and provided with jaw means; and
   rotating screw means for adjusting said lock means comprising linkages pivotally connected together in the form of a parallelogram and pivotally secured to said bar means and said lock means, a pair of nuts one of which has right hand threads and the other has left hand threads pivotally connected to said parallelogram linkage, and a screw engaging said nuts, whereby said lock means can be adjusted along said bar means by rotation of said screw.